(12) United States Patent
Shaw et al.

(10) Patent No.: US 9,993,925 B2
(45) Date of Patent: Jun. 12, 2018

(54) END EFFECTOR APPARATUS AND METHODS FOR HANDLING COMPOSITE STRUCTURES

(71) Applicant: The Boeing Company, Chicago, IL (US)

(72) Inventors: Paul D. Shaw, Charleston, SC (US); Raviendra S. Suriyaarachchi, Charleston, SC (US); Richard Edward Heath, Mt. Pleasant, SC (US)

(73) Assignee: The Boeing Company, Chicago, IL (US)

( * ) Notice: Subject to any disclaimer, the term of this patent is extended or adjusted under 35 U.S.C. 154(b) by 0 days. days.

(21) Appl. No.: 14/835,635

(22) Filed: Aug. 25, 2015

(65) Prior Publication Data
US 2017/0057100 A1    Mar. 2, 2017

(51) Int. Cl.
*B25J 15/06*    (2006.01)

(52) U.S. Cl.
CPC .................. *B25J 15/0616* (2013.01)

(58) Field of Classification Search
CPC .. B25J 15/0616; B30B 15/064; B29C 35/045; B24N 3/086
USPC ...... 294/185, 188, 189, 65, 119.3, 186, 288, 294/289; 425/3, 371.1, 388, 393, 403, 425/405.1; 100/35
See application file for complete search history.

(56) References Cited

U.S. PATENT DOCUMENTS

| | | | | |
|---|---|---|---|---|
| 3,318,468 A | * | 5/1967 | Olson | B66F 9/181 294/186 |
| 3,720,433 A | * | 3/1973 | Rosfelder | B66C 1/0243 294/188 |
| 3,743,340 A | * | 7/1973 | Williamann | B66C 1/0212 294/186 |
| 4,389,064 A | * | 6/1983 | Laverriere | B66C 1/025 209/905 |
| 4,511,386 A | * | 4/1985 | Kellar | C03B 23/0357 294/188 |
| 4,579,573 A | * | 4/1986 | Fecik | C03B 23/0302 294/65 |
| 4,787,662 A | * | 11/1988 | Dewez | B65G 47/91 294/65 |
| 4,931,341 A | * | 6/1990 | Haffer | B65G 47/91 209/905 |

(Continued)

*Primary Examiner* — Paul T Chin
(74) *Attorney, Agent, or Firm* — Kwan & Olynick LLP

(57) ABSTRACT

Provided are end effectors and methods of using such end effectors for handling various composite structures. An end effector includes a support structure bendable relative the principal axis of the end effector. The support structure is disposed within a cavity partially formed by an engaging portion of the end effector. The engaging portion is formed from a flexible material and includes multiple openings in fluid communication with the cavity. When the engaging portion contacts a composite structure and when the pressure inside the cavity is reduced below the ambient level, the composite structure is forced against the engaging portion due to this pressure differential. The flexibility of the support structure and of the engaging portion allows the end effector to conform to the shape of the composite structure. At the same time, the support structure maintains the shape of the cavity in the directions normal to the principal axis.

20 Claims, 14 Drawing Sheets

(56) References Cited

U.S. PATENT DOCUMENTS

| | | | | |
|---|---|---|---|---|
| 5,106,568 | A * | 4/1992 | Honka | B29C 70/342 |
| | | | | 156/286 |
| 6,257,866 | B1 * | 7/2001 | Fritz | B29C 51/06 |
| | | | | 425/387.1 |
| 6,668,589 | B1 * | 12/2003 | Mizusugi | C03B 23/0357 |
| | | | | 65/106 |
| 8,997,642 | B2 | 4/2015 | Stewart et al. | |
| 2002/0180104 | A1 * | 12/2002 | Kobayashi | B29C 70/345 |
| | | | | 264/258 |
| 2004/0051323 | A1 * | 3/2004 | Stohr | B25J 9/1015 |
| | | | | 294/65 |
| 2006/0090856 | A1 * | 5/2006 | Nelson | B29C 70/386 |
| | | | | 156/510 |
| 2009/0008825 | A1 * | 1/2009 | Eberth | B29C 31/008 |
| | | | | 264/308 |
| 2011/0121487 | A1 * | 5/2011 | Topping | B29C 70/48 |
| | | | | 264/258 |
| 2013/0082475 | A1 * | 4/2013 | Fukano | B65G 47/91 |
| | | | | 294/188 |
| 2013/0127192 | A1 * | 5/2013 | Regan | B25J 15/0675 |
| | | | | 294/185 |
| 2016/0354982 | A1 * | 12/2016 | Prause | B29C 70/34 |

\* cited by examiner

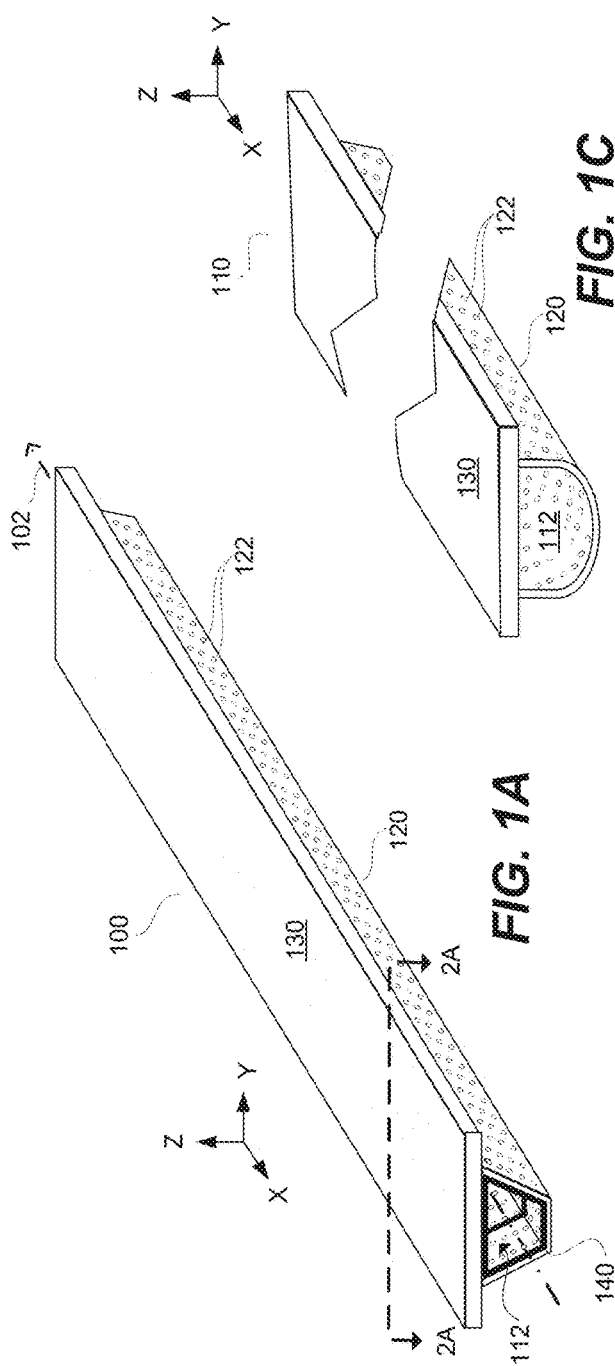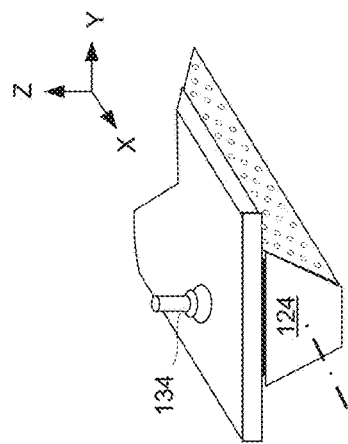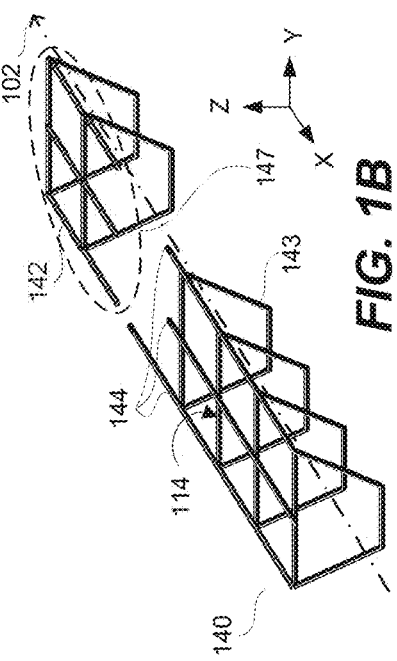

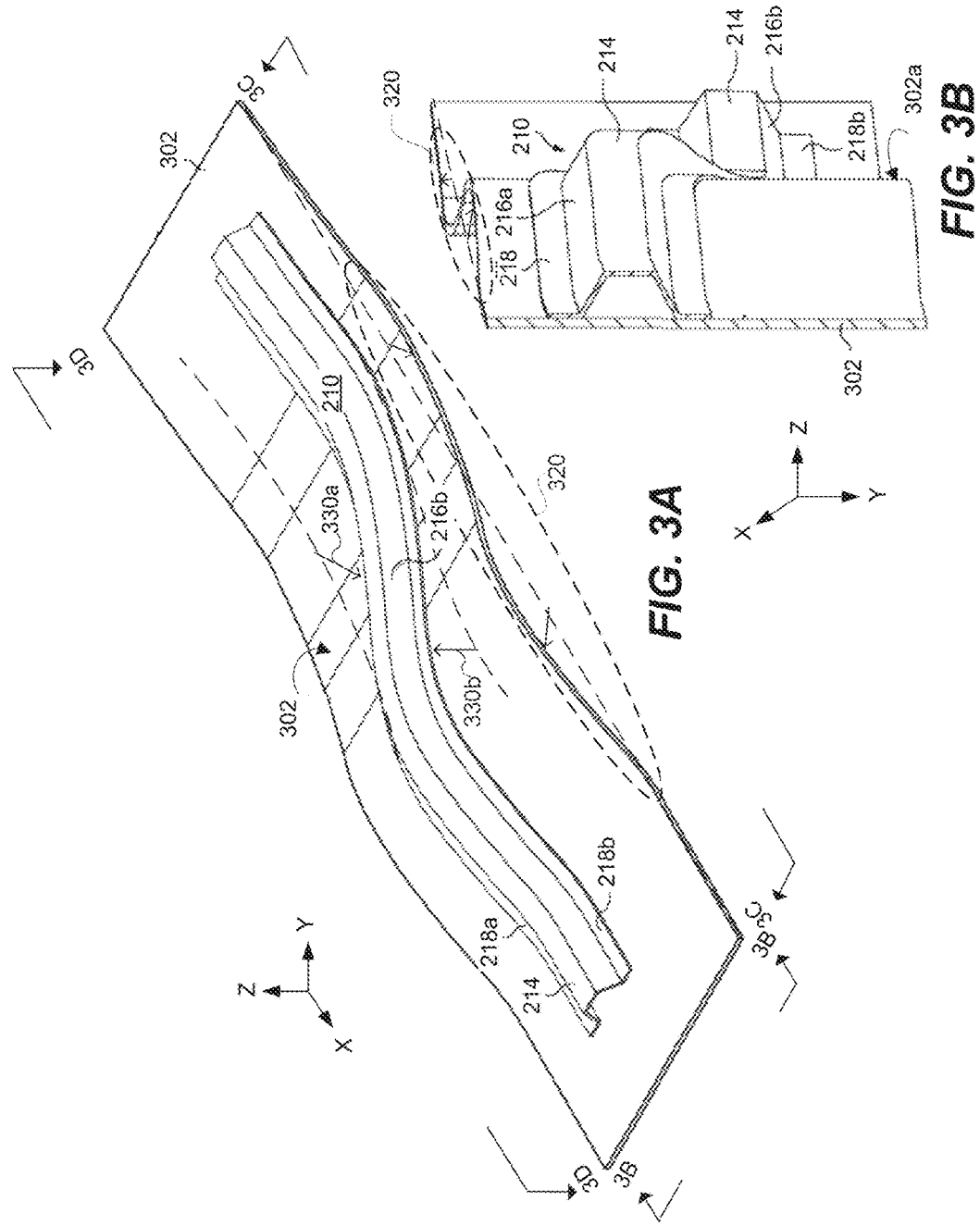

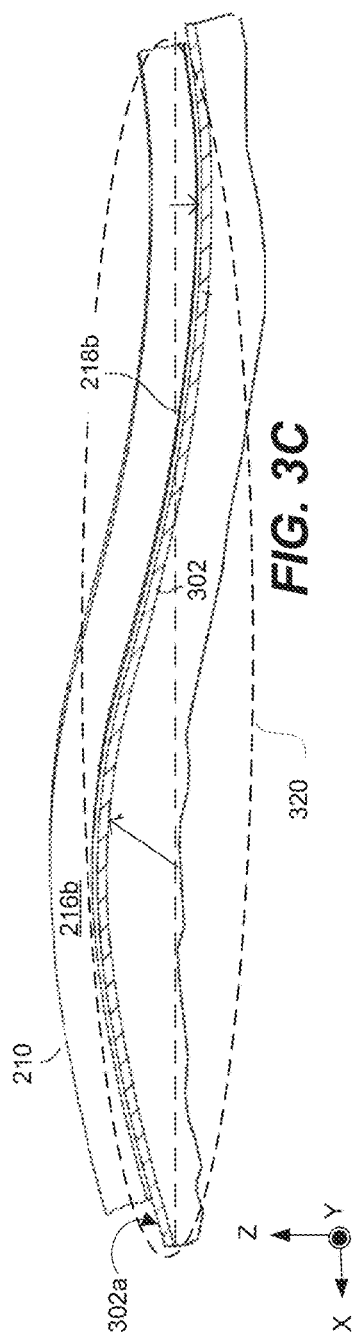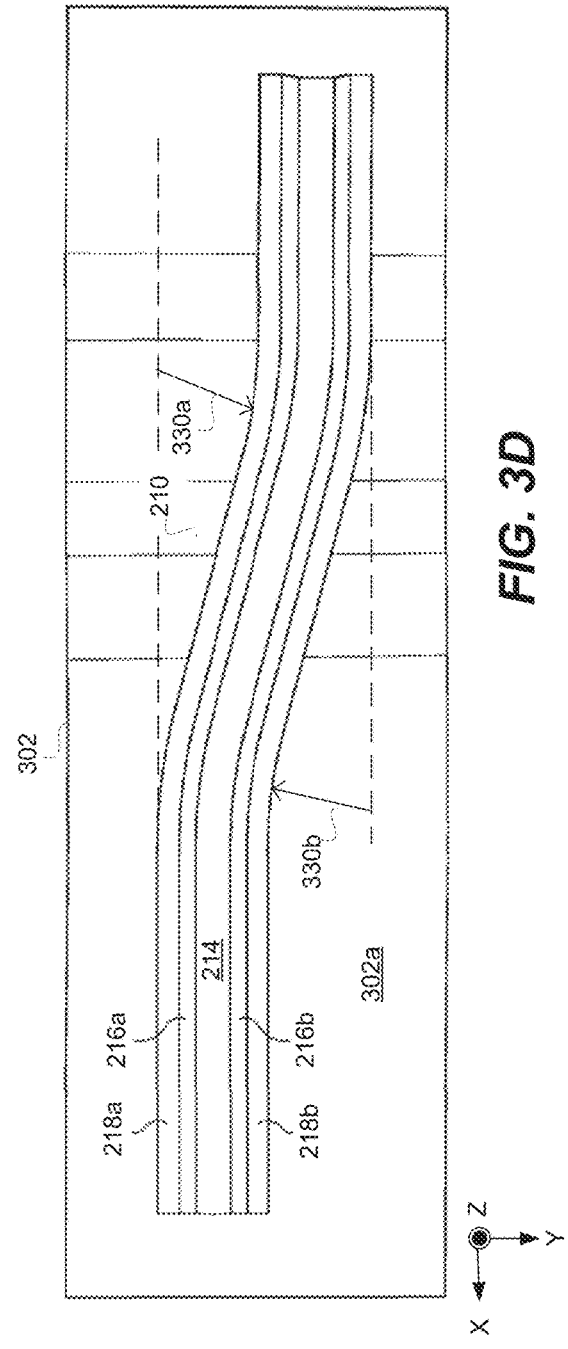

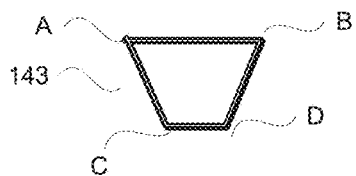
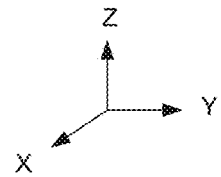
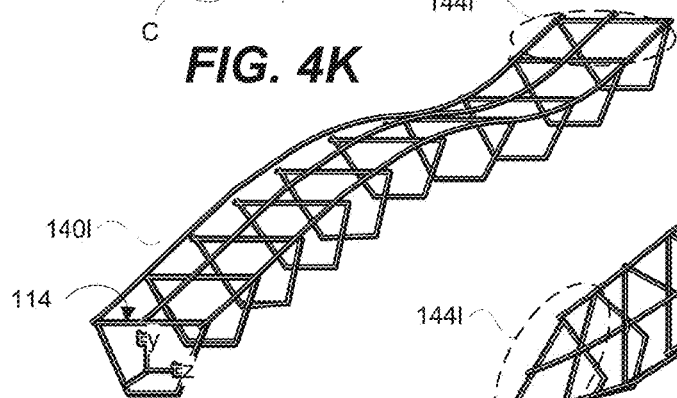
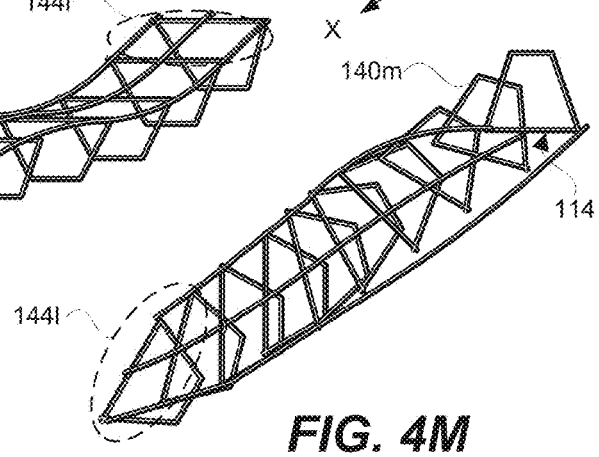
FIG. 4K
FIG. 4L
FIG. 4M
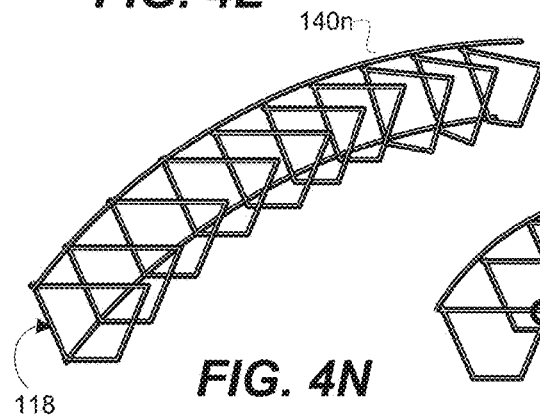
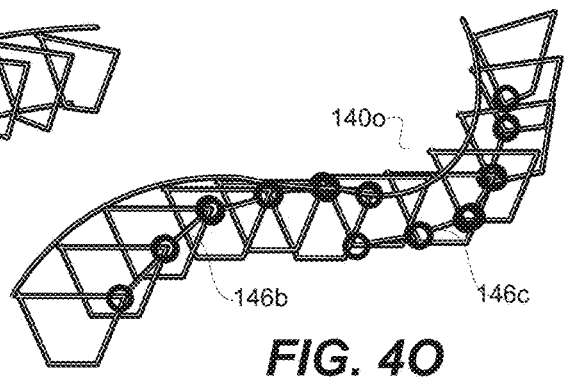
FIG. 4N
FIG. 4O
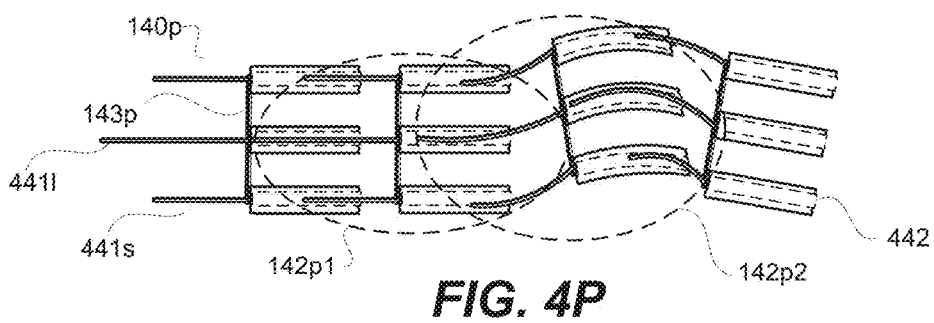
FIG. 4P

END EFFECTOR APPARATUS AND METHODS FOR HANDLING COMPOSITE STRUCTURES

BACKGROUND

This disclosure is related to the field of composite structure manufacturing, particularly to precision shaping of composite structures into complex contours and maintaining the shape during curing and other processes, such as transport and storage.

During fabrication of composite structures (especially contoured structures such as aircraft stringers), various devices may be used for handling the composite structures. Depending on the design of a composite structure, it may require contour along one or more planes. Conventional compactors and other like devices are capable of handling composite structures flexible along a single plane of curvature. However, composite structures with more complex designs are typically handled manually. The manual handling may introduce variations into the finished part. Furthermore, multiple different devices are typically used for handling, compacting, curing, and other operations. This results in increased manufacturing and operating costs and manufacturing complexity.

SUMMARY

Provided are end effectors and methods of using such end effectors for handling various composite structures. An end effector includes a support structure bendable relative the principal axis of the end effector. The support structure is disposed within a cavity partially formed by an engaging portion of the end effector. The engaging portion is formed from a flexible material and includes multiple openings in fluid communication with the cavity and the environment outside the end effector. When the engaging portion contacts a composite structure and when the pressure inside the cavity is reduced below the ambient level, this pressure differential pulls the composite structure against the engaging portion. The flexibility of the support structure and of the engaging portion allows the end effector to conform to the shape of the composite structure. At the same time, the support structure maintains the shape of the cavity in the directions normal to the principal axis.

As noted above, an end effector may be used for engaging a composite structure, such as a stringer. The end effector may be also used for transporting, storing, or curing the structure. Depending on the application, the design of the end effector may differ. In some embodiments, an end effector comprises a housing and a support structure disposed with a cavity of the housing. The housing comprises an engaging portion and a base. The cavity of the housing is surrounded by the engaging portion, the base, and, in some embodiments. Two or more end covers. In other words, the engaging portion (120,) the base, and, if present, the end covers define the cavity of the housing. The base may protrude beyond the engaging portion and form a flange. Alternatively, the footprint (or projection) of the base and engaging portion may be the same such that the base does not form a flange.

The engaging portion comprises a plurality of openings, which are in fluid communication with the cavity. These openings are used for applying pressure (positive or negative) to the composite part engaged by the end effector. The engaging portion of housing may be formed from a gas-impermeable material pierced by perforations that serve as the openings. Alternatively, the engaging portion is formed from a gas-permeable material having the plurality of openings as an intrinsic characteristic. For example, the gas-permeable material may have pores or other channels for gas to pass through the gas-permeable material. The pores or channels may be views as micro-scale openings and no additional openings may be provided. Alternatively, both micro-scale and macro-scale (e.g., more than 1 millimeter in diameter) may be provided. In some embodiments, the gas-permeable material of the engaging portion is a mesh. In some embodiments, the plurality of openings forms an array in which the openings are evenly spaced within the engaging portion. Such an array may comprise perforations made in a gas-impermeable material, intrinsic pores or channels in a gas-permeable material, or mesh. In some embodiments, engaging portion and base have essentially identical material compositions. In some embodiments, engaging portion and base are fabricated as a single piece.

The support structure of the end effector is disposed inside the cavity, supporting the engaging portion relative to the base. In some embodiments, engaging portion is sufficiently flexible to conform to a variety of shapes of support structure inserted into cavity. The support structure may be bendable or twistable relative a principal axis. In some embodiments, the support structure is bendable in two planes perpendicular the principal axis of the end effector. The two planes may be perpendicular to the principal axis. For example, if principal axis is defined as a local x-axis, some embodiments of end effector may be bent in the x-z plane or the x-y plane, twisted in the y-z plane, or any combination. In some embodiments, support structure may be unbent or re-bent between uses to produce composite structures of different shapes. In some embodiments, support structures may be interchanged in housing to produce variations in the cross-sectional shape of end effector.

In some embodiments, assembled end effector is stiffer than either housing or support structure alone. While support structure shapes housing, housing may exert an inward compressive force around the lateral perimeter of support structure. In some embodiments, end effector is further stiffened by the laid-up material of composite structure being pulled inward against the walls of engaging portion.

In some embodiments, the support structure is a wireframe. As used herein, "wireframe" shall mean any openwork design with empty spaces in its boundaries and interior allowing the free passage of ambient gases, regardless of the materials constituting the structure. The support structure may comprise modules. The modules may be interconnected at the base-adjacent side of the support structure. These interconnections may be rigid, flexible, or mixed. More specifically, the modules may be rigidly interconnected at the base-adjacent side of the support structure. In some embodiments, the modules are interconnected at the cap-adjacent side of the support structure. These connections may be slidable. More specifically, the modules may be interconnected at the cap-adjacent side of the support structure using slidable connectors, such as telescoping connectors.

In some embodiments, the modules comprise shaped frames. When the end effector is unbent to its maximum length, these shaped frames may extend parallel to each other and, for example, to a plane perpendicular to the principal axis (the y-z plane if the principal axis is considered to be the x-axis). The shaped frame may have a non-base-adjacent portion of its perimeter matching at least part of the composite structure. The shaped frame may be rigid and its perimeter shape may remain stable throughout operation of the end effector. In some embodiments, the cross-sectional profile is a trapezoid.

At the same time, orientation (e.g., angular orientation) of the shaped frames may change as the support structure is being bent relative, or twisted around, the principal axis of the end effector. One having ordinary skills in the art would understand that the cross-sectional provide can vary to simulate the cross-sectional profile of a composite part being supported. The trapezoidal cross-sectional profile is just one example. In other examples, cross-sectional profile may conform to rounded hats, J, T, L, and I cross sections In some embodiments, the end effector further comprises one or more ports for connecting at least one of a vacuum source or a gas source. The one or more ports may be in fluid communication with the cavity. The one or more pressure ports may be positioned on the base. Alternatively, the one or more pressure ports may be positioned at the ends (#B) of the cavity.

In some embodiments, the end effector further comprises a heater for controlling a temperature of at least one of the engaging portion or the base. As further described below, the heater may be used to heat at least one of the engaging portion or the base in order to change flexibility of one of these portions. Furthermore, the heater may be used to heat the composite structure during, for example, curing of this composite structure. The heater may be disposed within the base. In the same or other examples, the heater may be disposed within the engaging portion. In some cases, the end effector may include two or more heaters, e.g., one disposed within the engaging portion and one disposed within the base.

Also provided is a method of engaging the composite structure using the end effector, some examples of which are described above. The method may comprise contacting the composite structure with the engaging portion. Once the engaging portion is in contact with the composite structure, the method may proceed removably adhering the composite structure with the engaging portion. For example, the method may involve reducing pressure within the cavity of the housing. This reduction of the pressure within the cavity forces the composite structure against the engaging portion.

In some embodiments, the method further comprises, prior to contacting the composite structure with the engaging portion, heating the engaging portion. This heating may reduce flexibility of the engaging portion. Likewise, the base may be heated to increase its flexibility and/or other purposes. In some embodiments, heating the engaging portion comprises blowing hot air through the cavity and the plurality of openings. In the same or other embodiments, heating the engaging portion comprises using a heater in thermal communication with the housing.

In some embodiments, the method further comprises, after contacting the composite structure with the engaging portion, heating the engaging portion. This post-engagement heating may be, for example, a part of curing the composite structure. In some embodiments, the method further comprises curing the composite structure while the composite structure is in contact with the engaging portion. The cavity may be pressurized while curing the composite structure.

These and other embodiments are described further below with reference to the figures.

BRIEF DESCRIPTION OF THE DRAWINGS

FIGS. 1A-1D are schematic representations of an end effector for engaging composite structures, and some of its constituent parts, in accordance with some embodiments.

FIGS. 3A-3D are schematic representations of a composite structure attached conformally to another composite structure with compound curvature, in accordance with some embodiments.

DETAILED DESCRIPTION

Figure 2A:
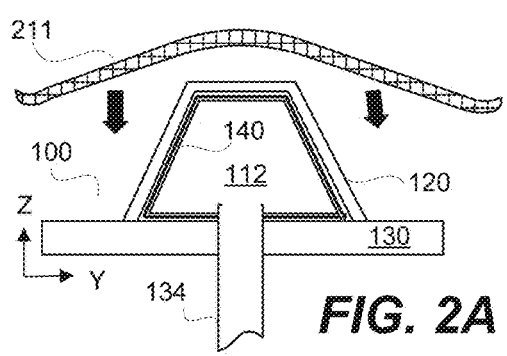
FIGS. 2A-2G are schematic representations of the operation of an end effector to process a composite structure in different stages of fabrication, in accordance with some embodiments.

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting.

Introduction

Composite structures are being used for many new applications, such as aircraft and automotive bodies. Fabrication of the composite structures often requires various handling operations, which may include transporting, storing, compaction, curing, and many other operations. For purposes of this description, handling is defined as any operation during which a composite structure is engaged by processing equipment. In some embodiments, handling is performed on un-cured composite parts, which are sometimes referred to as "green state" composite parts. Once the composite part is cured, it may be self-supporting and not as flexible. As a result, the methods and systems described herein may not be needed for cured composite structures. Different handling operations may have different processing conditions and requirements, such as temperature, pressure, orientation, shape, and the like. Conventionally, different tools are used for different handling operations. For example, transporting may be performed using one tool, while compaction may be performed using another tool. End effectors described herein allow using the same end effector for different handling operations while meeting the processing conditions and requirements. An end effector includes a supporting structure and an engaging portion supported by the supporting structure. The engaging portion conforms to some of the composite structure's contours to stabilize the composite structure's shape during handling operations. The supporting structure may be bent relative the principal axis of the end effector without affecting the cross-sectional profile of the engaging portion in the plane perpendicular to the principal axis. Because the support function is provided by the supporting structure rather than by the engaging portion, material options for the engaging portion is much greater allowing for additional applications and functionality of the end effector.

The engaging portion is designed to engage a composite structure during handling operations. The engaging portion may be made of a flexible material that engages the composite structure through a plurality of openings. The openings are provided on the surface of the engaging portion that comes in contact with the composite part. The openings are also in fluid communication with one or more of a vacuum source and a pressure source. This fluid communication may be provided, for example, by a cavity inside the end effector. For example, a pressure inside the cavity may be reduced relative to the ambient, causing ambient air between the engaging portion and the composite structure to be drawn into the cavity. The resulting suction forces the composite structure to adhere to (and, if the composite structure is in a flexible state (e.g., is an uncured composite preform), conform to) the engaging portion. The underlying stiff support structure maintains the shape of the engaging portion, thereby preventing the flexible engaging portion from collapsing or separating from the composite structure.

As context for better understanding of the disclosed design, configuration and use of end effectors, a brief description of an end-product example follows: FIGS. 3A-3D are views of a composite structure (a "hat stringer") in place on a compound-curved parent structure (e.g., a skin) in accordance with some embodiments. FIG. 3A is a perspective view of the composite structure. This perspective view also includes identification of all other views with arrows corresponding to FIG. 3B illustrating an end view (looking slightly down on FIG. 3A and rotated 90° clockwise relative to the view shown in FIG. 3A), arrows corresponding to FIG. 3C illustrating a side view, and arrows corresponding to FIG. 3D illustrating a top view. Each view also has a corresponding orientation of the X-Y-Z coordinate system. For example, the side view of FIG. 3C is coplanar to the X-Z plane, while the top view of FIG. 3D is coplanar to the X-Y plane. It should be noted that FIG. 3C represents a rotation about the Y axis extending perpendicular to this view, while FIG. 3D represents a rotation about the Z axis extending perpendicular to this view. This rotation about the Z axis may be also referred to as a joggle in which two parallel portions of the composite part are shifted with respect to each other in the Y direction. One having ordinary skills in the art would understand that the rotation about the X axis or a combination of two or three axes is also within the scope. A set of Cartesian x-y-z axes accompanies each view to show the relationships between the views.

Referring to FIGS. 3A-3D, composite structure 210 has a generally "hat-shaped" cross section, including cap 214, webs 216a and 216b, and flanges 218a and 218b. Composite structure 210 may be attached to interior surface 302a of skin 302 by the undersides of flanges 218. For example, flanges 218a and 218b may contact skin surface 302a along their entire length. Flanges 218a and 218b of composite structure 210 may be secured to skin 302 by any suitable means. In one example, fasteners (not shown) or bonding adhesives may be used. In the same or different example, co-curing composite structure 210 with skin 302 may be used if the curing conditions of skin 302 and composite structure 210 are compatible. In some applications, skin 302 and composite structure 210 may be fabricated from identical composite materials or different composite materials or have the same or different ply orientations at the bond interface. Skin 302 has a compound curvature. Composite structure 210 or, more specifically, flanges 218a and 218b may be independently curved in directions parallel to skin surface 302a. This may ensure consistent contact and structural properties of the finished assembly. This may also be an easier and more consistent method to handle composite structure 210 during the lay-up stage and fabricate it with the desired curvature.

Skin surface 302a has a complex x-z curvature 320, for example, having a twist as described above. Composite structure 210 conforms to x-z curvature 320 and also has independent x-y curvatures 330a and 330b. As mentioned above, a number of solutions exist for fabricating stringers curved in a single plane, but curvatures in two orthogonal planes have historically been more challenging.

Overview of End Effectors and their Potential Uses

FIGS. 1A-1D are schematic representations of end effector 100 for engaging composite structures, and some of its constituent parts, in accordance with some embodiments. Examples of such composite structures are described herein with reference to FIGS. 2A-2G and 3A-3D. One having ordinary skills in the art would understand that variations of end effector 100 may be used on other types of composite structures.

End effector 100 may include housing 110 and support structure 140 disposed within cavity 112 of housing 110. As shown in FIG. 1C, housing 110 comprises engaging portion 120 and base 130. Engaging portion 120 is the portion that contacts a composite structure during operation of end effector 100. Various examples of engaging portion 120 are described in the discussion of FIGS. 6A-6B.

Base 130 may not contact the composite structure during operation of end effector 100. As such, various characteristics (e.g., elasticity, gas permeability, chemical resistance) may be different for engaging portion 120 and base 130. Various examples of base 130 are described below with reference to FIGS. 6A-6B.

As shown in FIG. 1C, cavity 112 of housing 110 is surrounded by engaging portion 120 and base 130. Engaging portion 120 and base 130 may be made of different materials or the same material, and may be constructed from multiple pieces or as a single piece. As shown in FIG. 1D, the ends of cavity 112 may be sealed or covered by end cover 124, which may be part of housing 110 (e.g., a flap that may be closed), part of support structure 140 (e.g., a version of shaped frame 143 with a solid, rather than open, interior), or a separate piece (e.g., a plug that engages with one or more of the nearest shaped frames 143). In other words, engaging portion 120, base 130, and end cover 124 may define cavity 112 of housing 110. Engaging portion 120 of housing 110 comprises openings 122, which are in fluid communication with cavity 112 and the environment outside housing 110. Openings 122 are used to allow the airflow for applying pressure (positive or negative) to the composite part engaged by end effector 100.

As shown in FIG. 1A, support structure 140 is inside cavity 112 and supports engaging portion 120 relative to base 130. In some embodiments, support structure 140 may be the dominant contributor to the cross-sectional shape (through section line 2A-2A of FIG. 1A) of end effector 100. Support structure 140 may be bendable relative principal axis 102 of end effector 100. For purposes of this document, principal axis 102 is defined as an axis along the longest dimension of end effector 100. It should be noted that principal axis 102 is not necessarily a straight line and may also change its shape during operation of end effector 100. In some embodiments, support structure 140 is bendable in the x-y plane or the x-z plane, where principal axis 102 is a local x-axis. The bendable aspects of support structure are further described below with reference to FIGS. 4L-4P and shown in these figures.

FIG. 1B is a schematic representation of a support structure 140 that may be inserted, for example, in housing 110 shown in FIG. 1C, in accordance with some embodiments. Support structure 140 may be a wireframe (intended to mean, for purposes of this document, an open, "skeletal" armature made of wire or any other suitable material). Support structure 140 may define principal axis 102 and give shape to end effector 100 as shown in FIG. 1A, while housing 110 may brace support structure 140 by applying a compressive force (e.g., engaging portion 120 may be an elastically stretchable material that stretches to accommodate support structure 140, or engaging portion 120 may be a non-stretch material and support structure 140 may act as a compressible spring, being compressed for insertion and re-expanding itself when released until the non-stretch material of engaging portion 120 is taut. In some embodiments, various different support structures 140 may be interchanged by insertion in, or extraction from, housing 110.

In FIG. 1B, support structure 140 may be constructed of multiple shaped frames 143 mounted to a common connection 144. Alternatively, support structure 140 may be modular, with each module 142 including one or more shaped frames 143 (e.g., 2 shaped frames as illustrated) and a mateable connecting section 147. In FIG. 1B, connection 144 is a trio of rods on base-adjacent side 114 of support structure 140, but in some embodiments connection 144 may be of a different form, or attached to a different side of shaped frame 143, or both. In some embodiments, all shaped frames 143 in a support structure 140 may be of a single size, shape, and aspect ratio as in FIG. 1B. Alternatively, a support structure 140 may include shaped frame 143 of more than one size, shape, or aspect ratio, e.g., to distribute strength or stiffness or to provide clearance for a neighboring object.

In FIG. 1D, end cover 124 may provide an airtight seal so that most air or other gas entering or exiting cavity 112 through pressure port 134 will flow through relatively small openings 122 rather than larger open ends of cavity 112.

FIGS. 2A-2G are schematic representations of the operation of an end effector to process a composite structure, in accordance with some embodiments. The views correspond to cross-sections through sectioning line 2A-2A in FIG. 1A, with the cutting plane extended to include newly added parts or objects near end effector 100. In FIG. 2A, unstructured composite material(s) 211 (which may include multiple layers, binders or matrices, etc.) are laid-up using end effector 100 in place of a mold.

Support structure 140 holds flexible engaging portion 120 in a shape corresponding to the inside-surface contours of a desired composite structure, leaving cavity 112 unobstructed. Engaging portion 120 and base 130 compress, thereby stiffening, support structure 140.

Because almost all the unstructured composite material(s) 211 may be laid-up on engaging portion 120 of end effector 100, it may be advantageous to position end effector 100 so that base 130 is on the bottom. In that configuration, gravity will work to hold the unstructured composite material(s) 211 on engaging portion 120 during the lay-up. In some embodiments, pressure port 134 may be inactive during the lay-up.

Figure 2B:
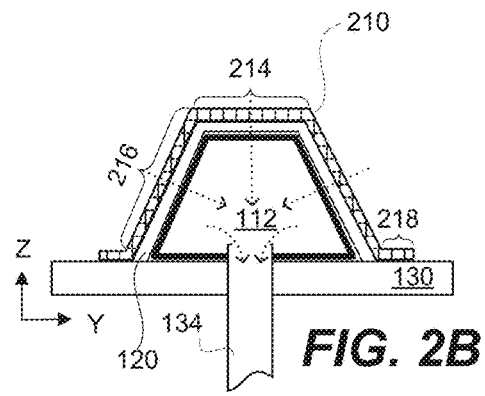

In FIG. 2B, air or other gas in cavity 112 is withdrawn through pressure port 134 until the pressure inside cavity 112 is lower than ambient. The exact value for a given type of composite structure 210 may depend on the angles between surfaces, sizes of desired features, and porosity and stiffness of unstructured composite material(s) 211. The lower pressure inside cavity 112 draws air or other gas in through openings 122 (see FIGS. 1A, 1C, 1D) in engaging portion 120 and draws unstructured composite material(s) 211 into contact with engaging portion 120, where it conforms and adheres by suction, consequentially taking on the form of composite structure 210. As illustrated, composite structure 210 has a "hat" shape common in stringers and other reinforcing ribs. Cap 214, formed against the base-opposing side of engaging portion 120, is flanked on either side by webs 216 formed against the inclined sided of engaging portion 120 and flanges 218 against base 130. Alternatively, as when flanges 218 may become distorted in shape if not held firmly, engaging portion 120 and its openings 122 may extend to the area of base 130 under each flange 218. In some embodiments, end effector 100 is further stiffened by adhered composite structure 210.

End effector 100 may now be inverted, if desired, to transport and/or store composite structure 210. In some embodiments, more gas may be continually withdrawn through pressure port 134 to hold composite structure 210 in place by suction. In some embodiments, composite structure 210 also adheres to engaging portion 120 by sufficiently strong friction and mechanical adhesion that the withdrawal of gas through pressure port 134 may be stopped (e.g., a vacuum pump may be turned off) without losing contact between engaging portion 120 and composite structure 210 or causing composite structure 210 to relax.

Figure 2C:
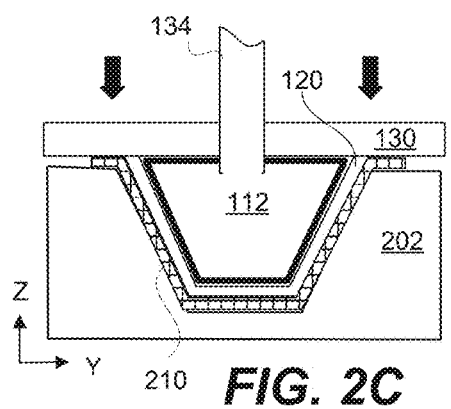

In FIG. 2C, inverted end effector 100 is used to transfer adhered composite structure 210 to rack 202. Just as end effector 100 conforms to the inner surface of composite structure 210, rack 202 conforms to the outer surface of composite structure 210. In some embodiments, composite structure 210 may be further compacted between end effector 100 and rack 202. As such, end effector 100 may be used for de-bulking, compacting, and consolidating composite structure 210.

Figure 2D:
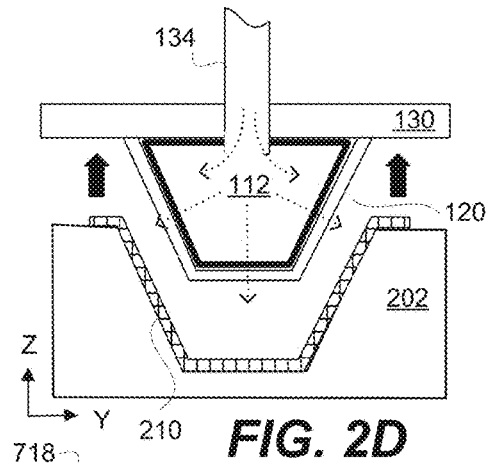

In FIG. 2D, air or other gas is caused to flow into cavity 112, creating an internal pressure that exceeds the ambient. The pressure differential acts to push the air or other gas out in engaging portion 120. The egress of the gas pushes composite structure 210 away from end effector 100, thus releasing composite structure 210 from end effector 100. End effector 100 may now be removed, leaving composite structure 210 in rack 202.

Figure 2E:
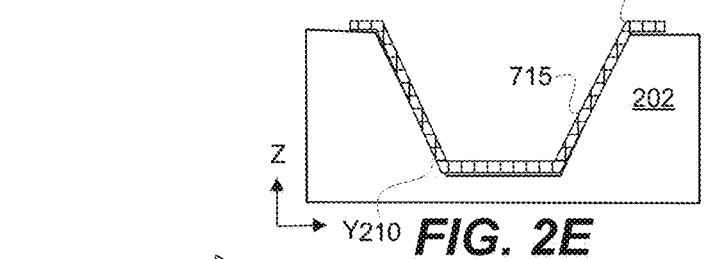

In FIG. 2E, composite structure 210 is being stored in rack 202; for example, composite structure 210 may remain in rack 202 while it waits to enter a batch process such as curing.

Figure 2F:
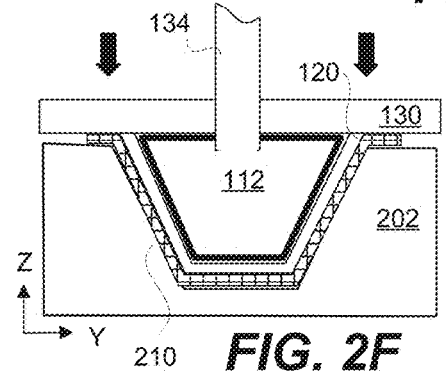
Figure 2G:
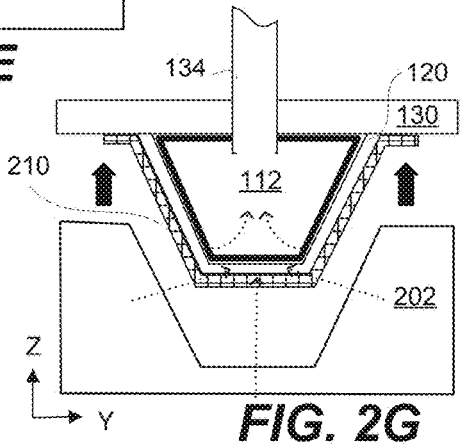

In FIG. 2F, end effector 100 returns to engage composite structure 210 in rack 202. In some embodiments, composite structure 210 may be cured on end effector 100 rather than rack 202 if the materials of end effector 100 can withstand the curing conditions. Alternatively, composite structure 210 may be cured in rack 202 or another holding scheme, then re-engaged with end effector 100 for transport to another processing station. In some embodiments, the flange area formed by base 130 is not present.

In FIG. 2G, air is again drawn into pressure port 134 from cavity 112, adhering composite structure 210 to engaging portion 120 for further transport or storage.

Examples of End Effectors

Variations on end effectors are described by describing some non-limiting examples of variations on their components, such as support structure 140, engaging portion 120, base 130, end cover 124, in addition to pressure ports 134 and heaters 132 that may be used therewith. Those of ordinary skill in the art will recognize that these component variations may be "mixed and matched" independently to construct a wide variety of end effectors 100.

Figure 4A:
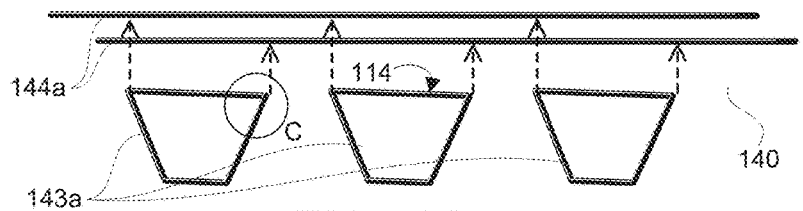
FIGS. 4A-4P are schematic representations of various examples of support structures, in accordance with some embodiments.

FIGS. 4A-4P are schematic representations of various examples of support structures 140, in accordance with some embodiments.

FIG. 4A schematically represents a support structure 140 constructed by connecting shaped frames 143a to a common connection 144a. As illustrated, shaped frame 143a has a trapezoidal perimeter (the shape desired in composite structure 210, with the exception of base-adjacent side 114 which does not contribute to composite structure 210's shape. In other examples, cross-sectional profile 145 may conform to rounded hats, J, T, L, and I cross sections. In some embodiments, common connection 144a is bendable, and shaped frames 143a are rigidly attached to common connection 144a to keep shaped frame 143a at a constant angle to common connection 144a as common connection 144a is bent into shape.

Figure 4B:
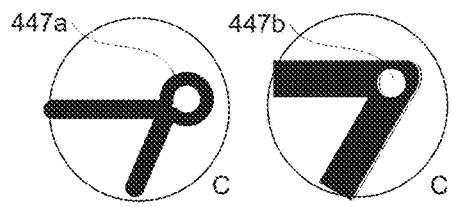

FIG. 4B schematically represents close-ups of area C in FIG. 4A showing examples of fittings for slidable versions of shaped frame 143 that may slide along common connection 144, e.g., to vary the frequency, size, or shape of shaped frame 143 along principal axis 102. For example, frequency may be increased (i.e., spacing between shaped frames 143 may be decreased) in sections of support structure 140 intended to be bent at tighter radii of curvature to keep the resulting curve of end effector 100 smooth. Loop 447a may be attached, for example, to shaped frames 143 constructed of bent rod or tube stock. Through-hole 447b may be created, for example, to shaped frames 143 constructed of stamped or molded strip or sheet stock. In some embodiments, either loop 447a or through-hole 447b may have a non-circular inner perimeter matching a non-circular cross-section of common connection 144. In some embodiments, either loop 447a or through-hole 447b may use additional parts to lock the position and/or orientation of shaped frame 143 relative to common connection 144.

Figure 4C:
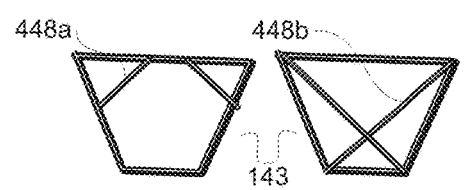

FIG. 4C schematically represents braced variations of shaped frame 143. If needed, radial stiffness can be added to shaped frame 143 to prevent distortion of the shape by compression from housing 110 (e.g., bending of the straight sides responsive to pressure on the corners). Corner braces 448a, cross-braces 448b, and other braces within the perimeter that shapes composite structure 210 may be less expensive or easier to handle than using a heavier stock for the entire shaped frame 143. As illustrated, corner braces 448a and cross-braces 448b occupy a small fraction of the interior of shaped frame 143 and therefore will not significantly impede a flow of gas in cavity 112.

Figure 4D:
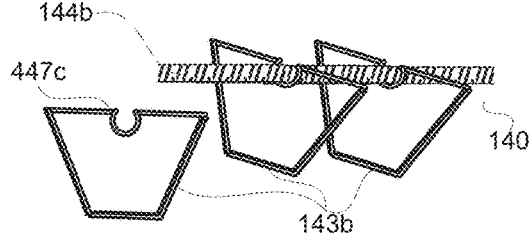

FIG. 4D schematically represents shaped frames 143b with split loops 447c for snapping onto or sliding along a single-track common connection 144b. Split loop 447c and common connection 144b may optionally have non-circular or keyed mating shapes to prevent shaped frame 143b from inadvertently rolling around single-track common connection 144b. Additionally or alternatively, locking parts may be used before and behind shaped frame 143b on common connection 144b to prevent uncontrolled pitch, roll, or yaw of shaped frame 143b. Single-track common connection 144b, a bendable stock or gooseneck construction, can easily bend into stable shapes in the x-y plane as well as the y-z plane (designating the x-axis as principal axis 102) without unbalanced stress on common connection 144b.

Figure 4E:
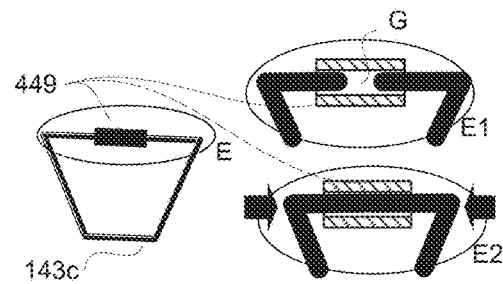

FIG. 4E schematically represents a temporarily collapsible shaped frame. If support structure 140 needs to be inserted into housing 110 from the end, the ability to temporarily collapse shaped frames 143 may make the task easier so that it consumes less operator time. Shaped frame 143c has a sleeve 449 on base-adjacent side 114 where it will not disturb the outlines of the other sides that shape composite structure 210. Often, base-adjacent side 114 may be the longest side of shaped frame 143, and thereby the most helpful side to shorten for insertion. E1 and E2 are magnified cut-away views of the area inside ellipse E on shaped frame 143c. In E1, the relaxed position where base-adjacent side 114 is at its full length, there is a gap G in base-adjacent side 114 inside sleeve 449. In E2, the collapsed position where base-adjacent side 114 is shortened, inward pressure is applied at the two corners to narrow or close gap G. In some embodiments, the compression exerted by housing 110 is insufficient to narrow or close gap G, and after insertion a restoring force of shaped frame 143c expands base-adjacent side 114 back top its full relaxed length.

Figure 4F:
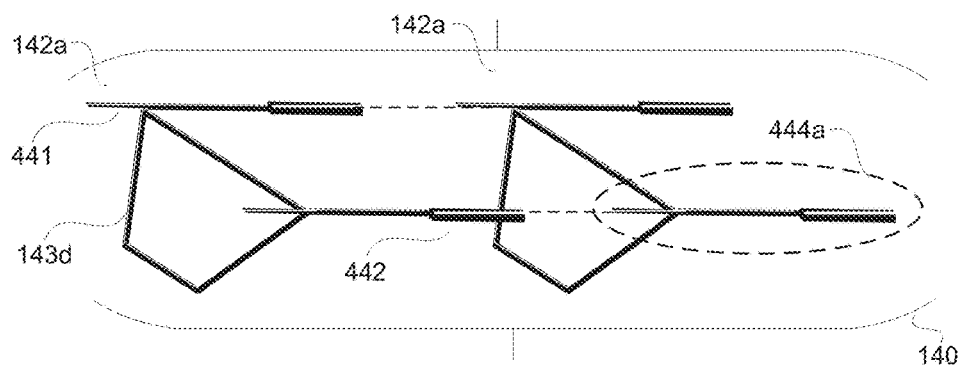

FIG. 4F schematically represents an example of a single-frame module comprising a shaped frame integrated with a linkable connecting section. This approach facilitates changing the length of support structure 140 without changing the length of common connection 144. It may also facilitate swapping out shaped frames 143d in the middle of support structure 140 by swapping out modules 142a, so that other shaped frames 143d can remain undisturbed.

In each module 142a, shaped frame 143d is attached to a connecting section. In this example, the connecting section includes a connecting subsection 444a at each of two corners of shaped frame 143d. Connecting subsection 444a made of a bendable material, includes interlocking features: Pin 441 in a first module 142a seats in sheath 442 of a second module 142b. Single-frame modules like 142a afford the maximum flexibility in the number of shaped frames 143d in assembled support structure 140.

Modules 142 may be interconnected by connecting sections 147 on base-adjacent side 114 of support structure 140. These connections may be rigid or bendable. In some embodiments, modules 142 are interconnected at one or more of base-adjacent side 114, non-base-adjacent sides (e.g., cap-adjacent side 116 or web-adjacent side(s) 418) of support structure 140, or at any combination of the sides. Some of these interconnections may include slidable connection sub-sections 146.

Figure 4G:
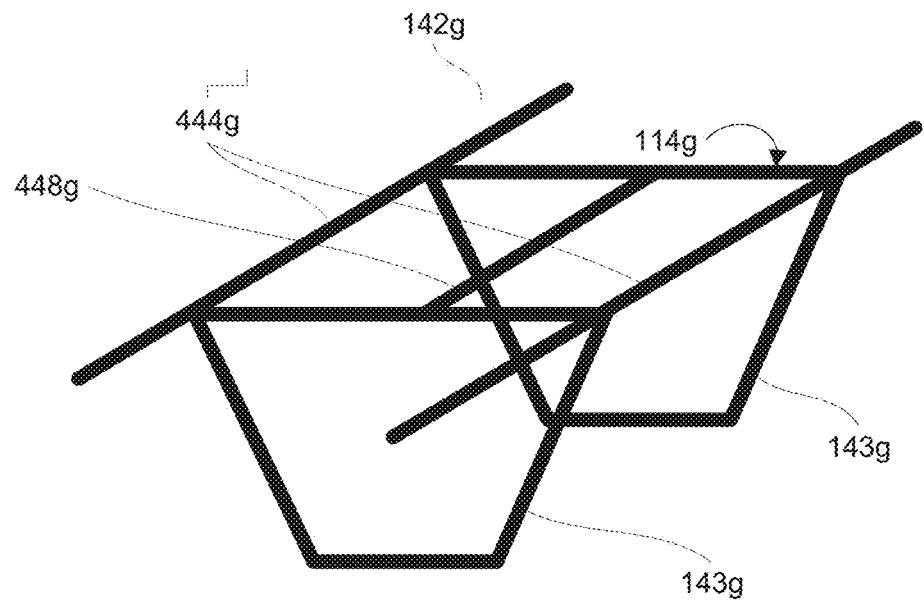
Figure 4H:
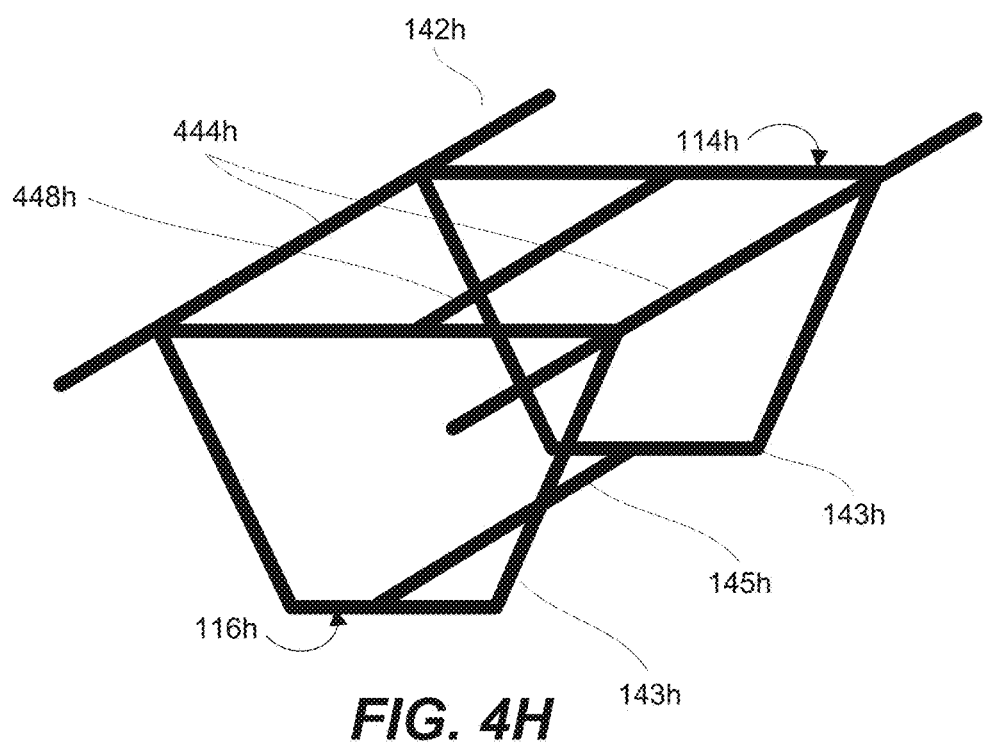
Figure 4I:
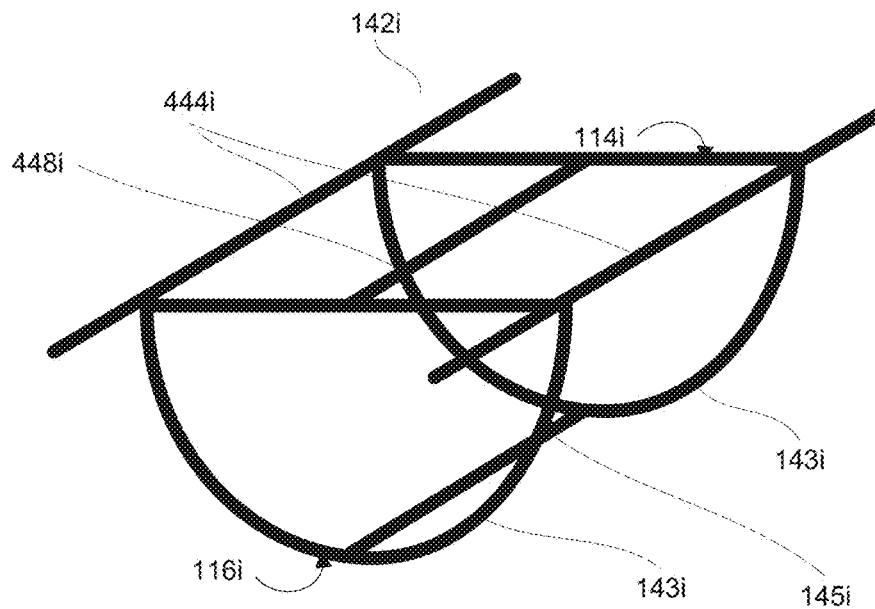

In some embodiments, modules 142 comprise shaped frames 143. When end effector 100 is not bent, shaped frames 143 may extend parallel to each other and, for example, in planes perpendicular to principal axis 102 (e.g., a y-z plane if principal axis 102 is defined as an x-axis). Shaped frames 143 may have an outer perimeter with non-base-adjacent sides matching part of composite structure 210. In some embodiments, the perimeter of shaped frame 143 may be trapezoidal. In other examples, cross-sectional profile 145 may conform to rounded hats, J, T, L, and I cross sections FIGS. 4G-4I schematically represent some examples of double-frame modules for constructing support structures 140. A multi-frame module speeds assembly and allows variation of connection stiffness between shaped frames 143.

FIG. 4G schematically represents a double-frame module connected only on base-adjacent side 114g. Only corner connector sub-sections 444g extend out to attach module 142g to neighboring modules. Brace 448 connects only shaped frames 143g included in module 142g. In some embodiments, brace 448g may be of a stiffer material or form factor than corner connection sub-sections 444g, which will tend to distribute the bending toward connections between modules 142g and away from intra-module connections between individual shaped frames 143g that are stiffened by brace 448g. This may be beneficial, for example, when a bend radius of composite structure 210 is intended to be kept above a minimum value.

FIG. 4H schematically represents a double-frame module connected on both base-adjacent side 114h and opposing cap-adjacent side 116h. Only corner connector sub-sections 444h extend out to attach module 142h to neighboring modules. Brace 448h and cap-adjacent connector 145h (which may be another brace) connect only shaped frames 143h included in module 142h. In some embodiments, brace 448h and/or cap-adjacent connector 145h may be of a stiffer material or form factor than corner connection sub-sections 444h, which will tend to distribute the bending toward connections between modules 142h and away from intra-module connections between individual shaped frames 143h that are stiffened by brace 448g. This may be beneficial, for example, when a bend radius of composite structure 210 is intended to be kept above a minimum value. Additionally or alternatively, cap-adjacent connector 145h may be of a smooth material and/or shape to ease insertion of module 142h into housing 110.

FIG. 4I schematically represents a non-trapezoidal double-frame module connected on both base-adjacent side 114i and opposing cap-adjacent side 116i. Although many of the examples herein use trapezoidal-perimeter shaped frames 143, the disclosed apparatus and methods are straightforward to apply to other frame shapes. Shaped frames 143i are U-shaped, e.g., to create arched stringers. V-shaped frames, rectangular frames, and hybrids or derivatives of rounded hats, J-shaped, T-shaped, L-shaped, I-shaped, U-shaped, V-shaped, trapezoidal, and rectangular frame shapes may be similarly constructed.

Only corner connector sub-sections 444i extend out to attach module 142i to neighboring modules. Brace 448i and cap-adjacent connector 145i (which may be another brace) connect only shaped frames 143i included in module 142h. In some embodiments, brace 448i and/or cap-adjacent connector 145i may be of a stiffer material or form factor than corner connection sub-sections 444h, which will tend to distribute the bending toward connections between modules 142i and away from intra-module connections between individual shaped frames 143i that are stiffened by brace 448g. This may be beneficial, for example, when a bend radius of composite structure 210 is intended to be kept above a minimum value. Additionally or alternatively, cap-adjacent connector 145i may be of a smooth material and/or shape to ease insertion of module 142i into housing 110.

Figure 4J:
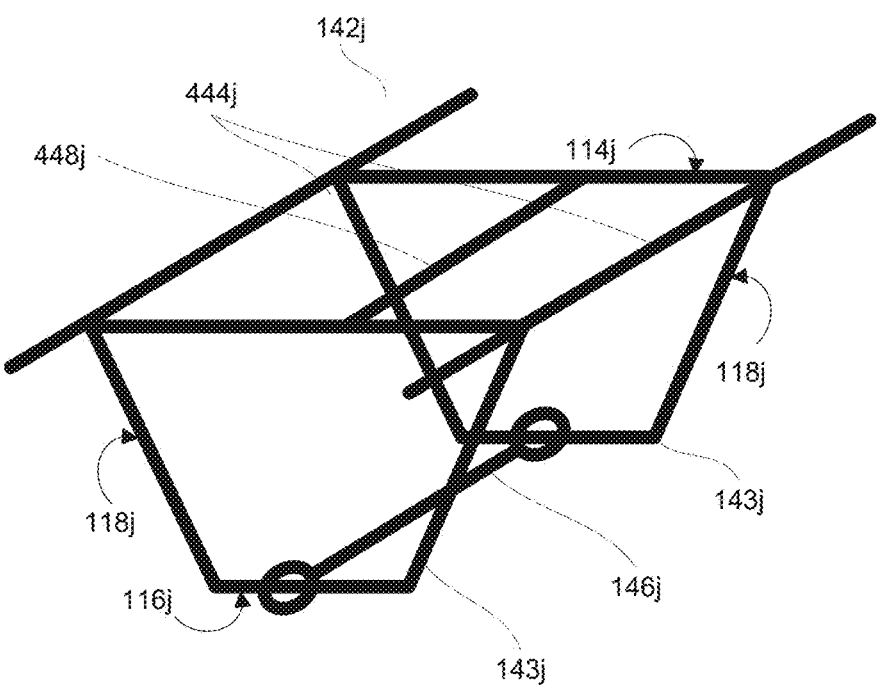

FIG. 4J schematically represents a double frame module with a mixture of fixed and slidable connection sub-sections. Corner connection sub-sections 444j and brace 448j on base-adjacent side 114j are fixedly connected to shaped frames 143j. Slidable connector 146j is free to slide anywhere along cap-adjacent side 116j or either of two web-adjacent sides 418j.

Shaped frames 143 may be rigid and may hold a constant perimeter shape during operation of end effector 100. At the same time, orientation (e.g., angular orientation) of shaped frames 143 may change relative to each other and to a global x-axis (corresponding to a baseline principal axis 102 of unbent end effector 100) as support structure 140 is bent in x-y or y-z planes or twisted around a local x-axis connecting pivot points of neighboring shaped frames 143.

FIGS. 4K-4P are schematic representations of different examples of interconnects as they affect be ability of the support structure to bend and twist. The effects on modular and non-modular support structures are analogous.

FIG. 4K introduces corner labeling for an example of trapezoidal shaped frame 143 to aid explanation of the locations of interconnections. The corners of the base-adjacent (longest) side are referred to as A and B, and the corners of the cap-adjacent (shortest) side are referred to as C and D.

Assuming the common connections or connecting sections can be bent or twisted but not macroscopically stretched or compressed (e.g., room-temperature metal wire, rod stock, strip stock, or tubing), a three-track fixedly attached connection 144l on a base-adjacent side 114 connecting corners A and C and a midpoint between the two) allows support structure 140l in FIG. 4L (a perspective view) to bend in the y-z plane and support structure 140m in FIG. 4M (a perspective view) to twist around the middle track of three-track connection 144l. However, support structures 140l and 140m may be difficult to bend in the x-y plane (except perhaps at very large radii) because, to bend three-track connection 144l in its own plane, the corner track on the outer edge of the bend would need to lengthen and the corner track on the inner edge of the bend would need to shorten. Similar behavior would result from connection in two or more places on cap-adjacent side opposite base-adjacent side 114.

One solution, when relatively tight bend radii are needed in both the y-z plane and the x-y plane, would be to use a single-track connection as in FIG. 4D. Another possibility would be to use sliding frames as in FIG. 4B and only lock one loop or hole for each frame, so that the other loops or holes could slide freely when support structure 140 is bent, redistributing some of the strain away from the connections. More bending in one direction than the opposite direction, however, might cause the ends of connections to protrude outward from shaped frames 143 at the ends of support structure 140.

Alternatively, if most of the bends for a part were designed to be in the x-y plane, two or more connections could be fixedly attached to web-adjacent side 118 as on support structure 140n in FIG. 4N (a perspective view), connecting corners A and C of shaped frames 143. This would increase bendability in the x-y plane but decrease it in the x-z plane.

In FIG. 4O, a perspective view, slidable connectors may offer some different bending options. In support structure 140o, a single fixed connection connects corners A of shaped frames 143. Some sliding connectors 146b have been slid to corners B of shaped frames 143, creating a base-adjacent side connection that allows significant bending in the y-z plane. Other sliding connectors 146c have been slid to corners C of shaped frames 143, creating a web-adjacent side connection that allows significant bending in the y-x plane. This may be effective where, for example, tight bend radii are not required in both the x-y and the y-z planes at the same place in support structure 140.

FIG. 4P is a cutaway top view of an embodiment of a modular support structure 140p with both x-y and y-z bending capability. The connector sections are similar to those in FIG. 4F, with pins 441 on one side of shaped frames 143p and sheaths 442 on the other side to connect neighboring modules together. In this version, however, pins 441 are non-uniform in length, with short pins 441s extending from two adjacent corners of shaped frame 143p and a long pin 441l extending from the midpoint between them. Sheaths 442 are still of uniform length and positioned a uniform distance from shaped frame 143p. Thus, when a pair of modules 142p is connected, long pin 441l "bottoms out" in its sheath 442 but neighboring short pins 441s only extend part of the way (e.g., halfway) down their sheaths.

Module 142p1 illustrates an embodiment with flexible pins 441s, 441l and inflexible sheaths 442. The flexible pins enable this three-track connection to bend in its own plane to the extent that sheaths 442 have loose or pliable inner walls. Module 142p2 illustrates an embodiment in which both pins 441s, 441l and sheaths 442 are flexible, allowing bending in the plane of the three-track connection limited only by the flexibility of the pin and sheath materials. The flexible pins enable this connection to bend in its own plane to the extent that sheaths 442 have loose or pliable inner walls.

Figure 5A:
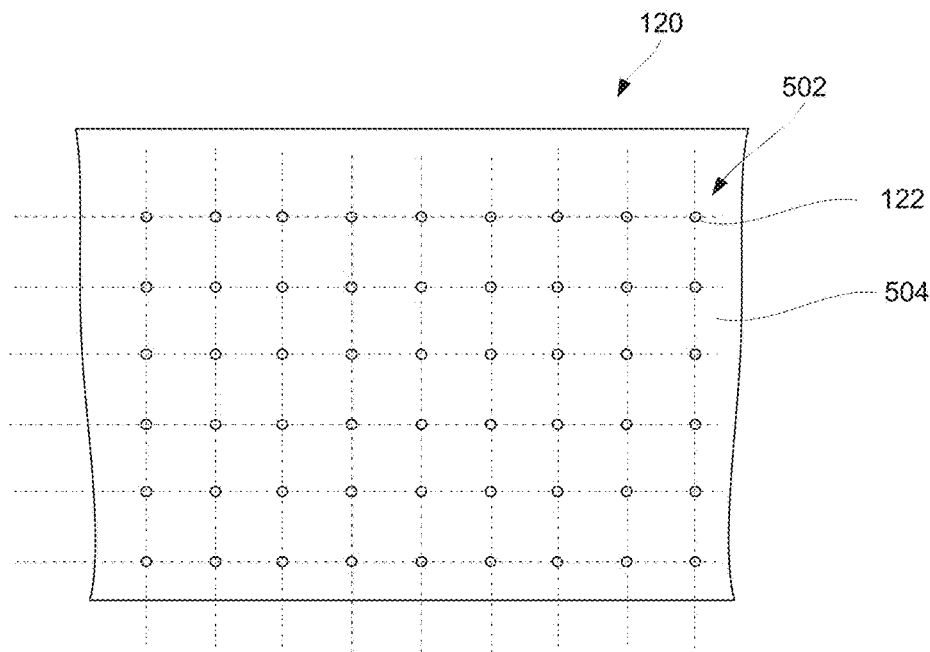
FIGS. 5A-5B are schematic representations of different examples of material types that may be used, for example, in an engaging portion of the end effector shown in FIG. 1, in accordance with some embodiments.
Figure 5B:
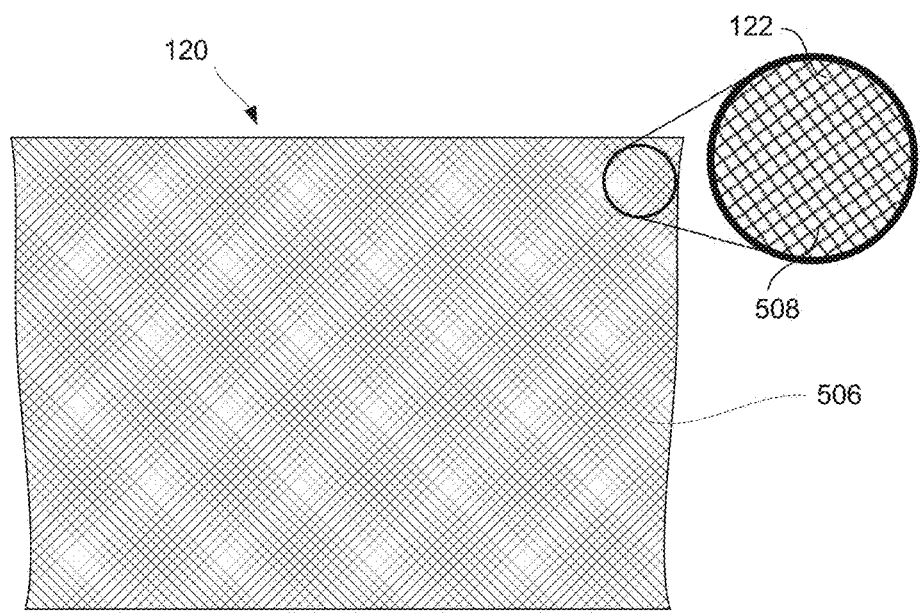

FIGS. 5A-5B are schematic representations of different examples of engaging portions that may be used, for example, in an end effector shown in FIG. 1, in accordance with some embodiments.

In some embodiments, the plurality of openings 122 forms array 502 in which the plurality of openings 122 are evenly spaced on engaging portion 120. Engaging portion 120 may be formed from a gas-impermeable material 504. Alternatively, engaging portion 120 is formed from a gas-permeable material 506 having the plurality of openings 122. For example, gas-permeable material 506 may have pores or other passes for gas to pass through gas-permeable material 506. In some embodiments, gas-permeable material 506 of engaging portion 120 is a mesh 508.

FIGS. 6A-6D are schematic representations of gas delivery and temperature control options for an end effector as shown in FIG. 1, in accordance with some embodiments.

In some embodiments, end effector 100 further comprises one or more pressure ports 134 for connecting at least one of a vacuum source 602 or a gas source 604 or 614. Pressure ports 134 may be in fluid communication with cavity 112. The degree of fluid communication may be automatically controlled. The one or more pressure ports 134 may be positioned on base 130. Alternatively, pressure ports 134 may be positioned at one or more end covers 124 at the ends of cavity 112.

In some embodiments, end effector 100 further comprises a heater 132 for controlling a temperature of at least one of engaging portion 120, base 130, or gases exiting cavity 112 through openings 122. As further described below, the heating of at least one of engaging portion 120 or base 130 by heater 132 may change the flexibility of one of these portions or its adhesion to unstructured composite material 211. Furthermore, heater 132 may be used for heat-processing (e.g., curing) composite structure 210.

Figure 6A:
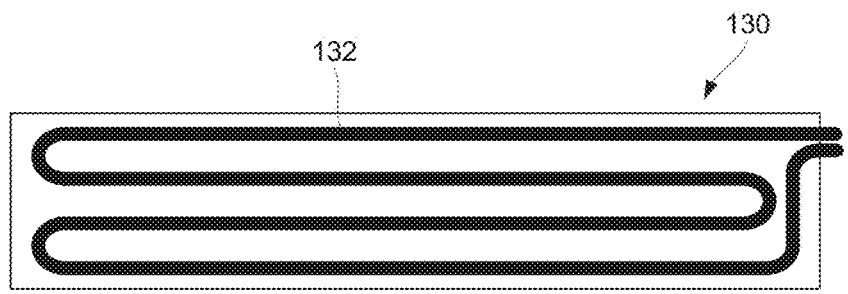
FIGS. 6A-6D are schematic representations of different examples of heaters and pressure ports that may be used, for example, in an end effector shown in FIG. 1, in accordance with some embodiments.
Figure 6B:
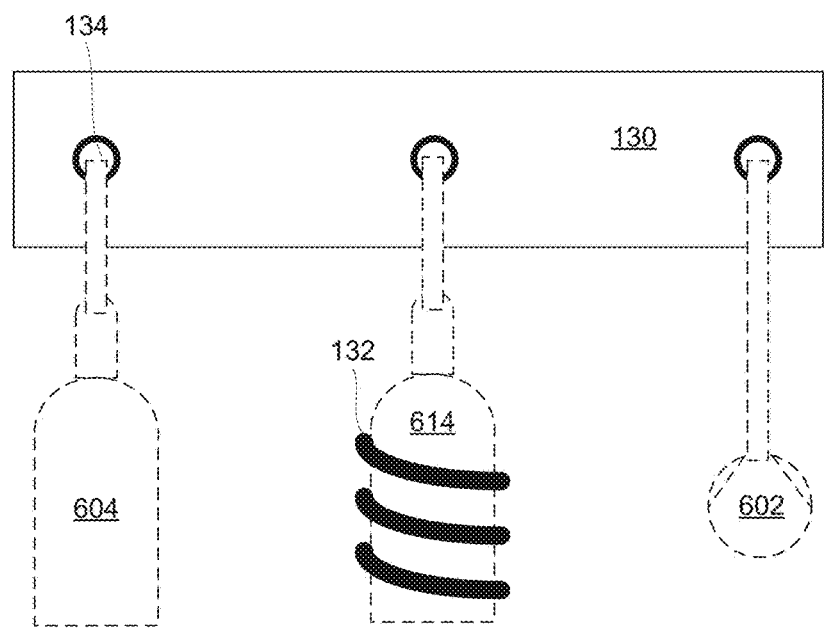
Figure 6C:
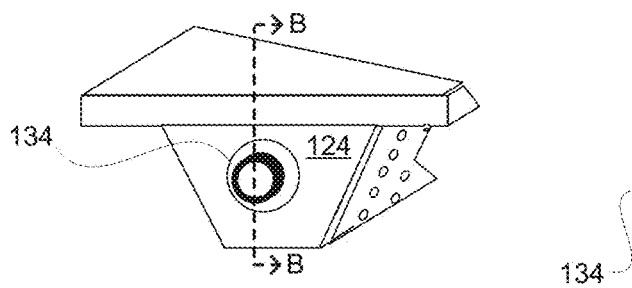
Figure 6D:
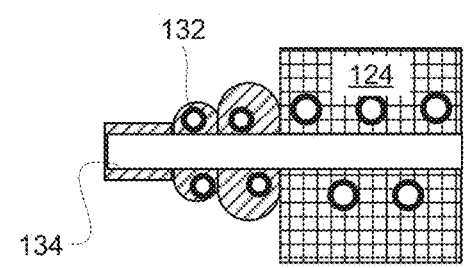

As in FIG. 6A, heater 132 may be disposed within base 130. As in FIG. 6B, at least one gas source 614 may be heated by heater 132. As in FIG. 6C, heater 132 may be integrated with end cover 124 and/or pressure port 134 to heat gas in-line as it enters cavity 112. Additionally or alternatively, heater 132 may be disposed within engaging portion 120. For example, mesh 508 or other gas-permeable material 506 may have flexible high-resistance wire interwoven to serve as heater 132. Similarly, gas-impermeable material 504 may have heating wire or a similarly-behaved material affixed with temperature-tolerant adhesive or some other means that does not compromise the gas-impermeability. In some embodiments, heating wires or similarly behaved materials integrated with engaging portion 120 run only in the longitudinal (x) direction to avoid impairing engaging portion 120's ability to stretch radially. In some embodiments, heating wires or similarly behaved materials are integrated with engaging portion 120 along zig-zag paths to preserve stretchability along the longitudinal axis of the zig-zag path.

In some cases, end effector 100 may include two or more heaters 132, e.g., one disposed within engaging portion 120 and one disposed within base 130.

Examples of Assembling and Using End Effectors

Figure 7A:
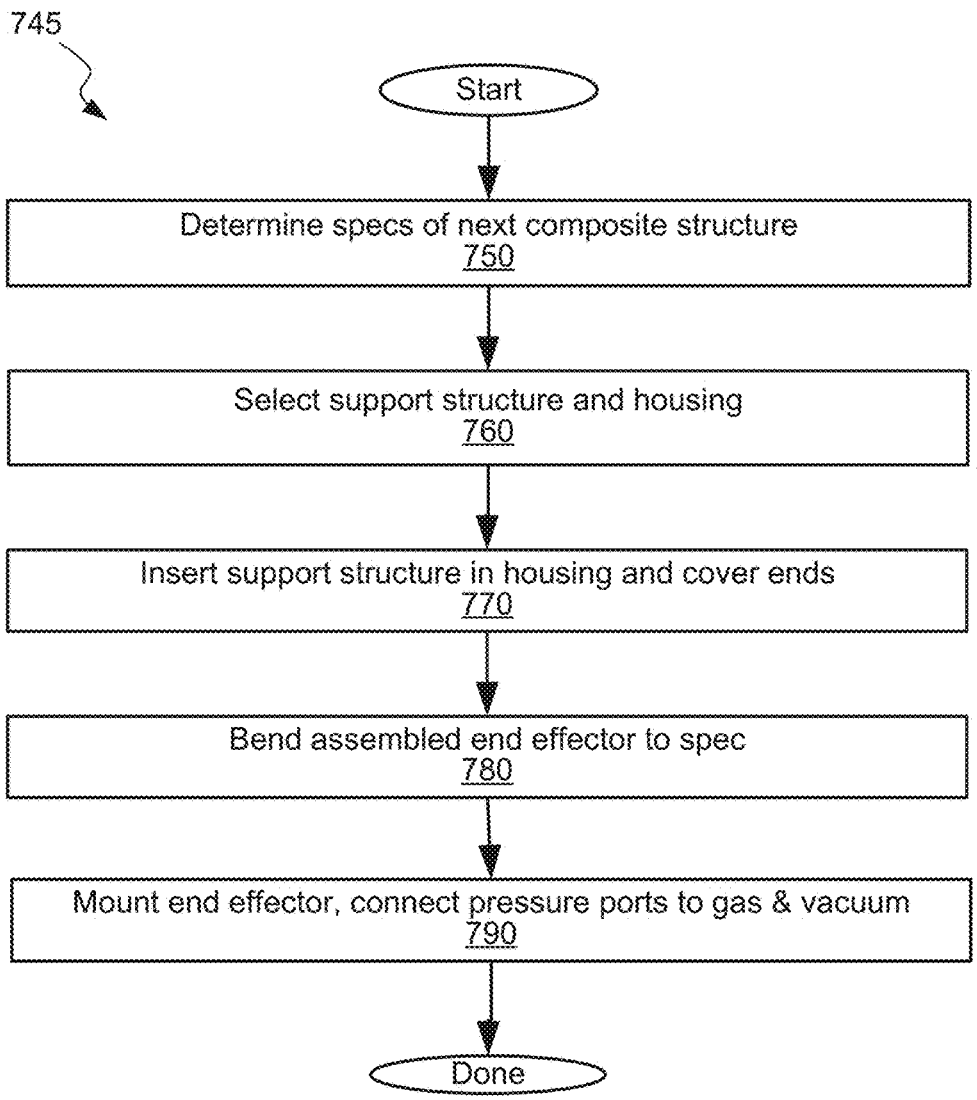
FIGS. 7A and 7B are process flowcharts corresponding to methods of assembling or reconfiguring an end effector and engaging a composite structure with an end effector, in accordance with some embodiments.

FIG. 7A is a process flowchart corresponding to a method of assembling an end effector, in accordance with some embodiments. Because the end effectors can be reconfigured to compact, transport, and store different parts by swapping or reshaping support structure 140, this assembly procedure has application beyond the initial manufacture of end effector 100.

Method 745 begins by determining the specifications of desired composite structure 210 during operation 750. Based on this determination, appropriate housing 110 and support structure 140 may be selected during operation 760. End effector 100 is assembled by inserting selected support structure 140 in selected housing 110 and installing or closing end covers 124 during operation 770. Bending end effector 100 to specification may be performed during operation 780, e.g., robotically using a stored algorithm or manually by fitting end effector 100 to a template. The template may be an outline on a known good mating part (e.g., a skin 302) for composite structure 210. Method 745 may conclude with mounting the end effector at its station including connecting gas and/or vacuum sources to pressure port(s) 134 during operation 790.

Figure 7B:
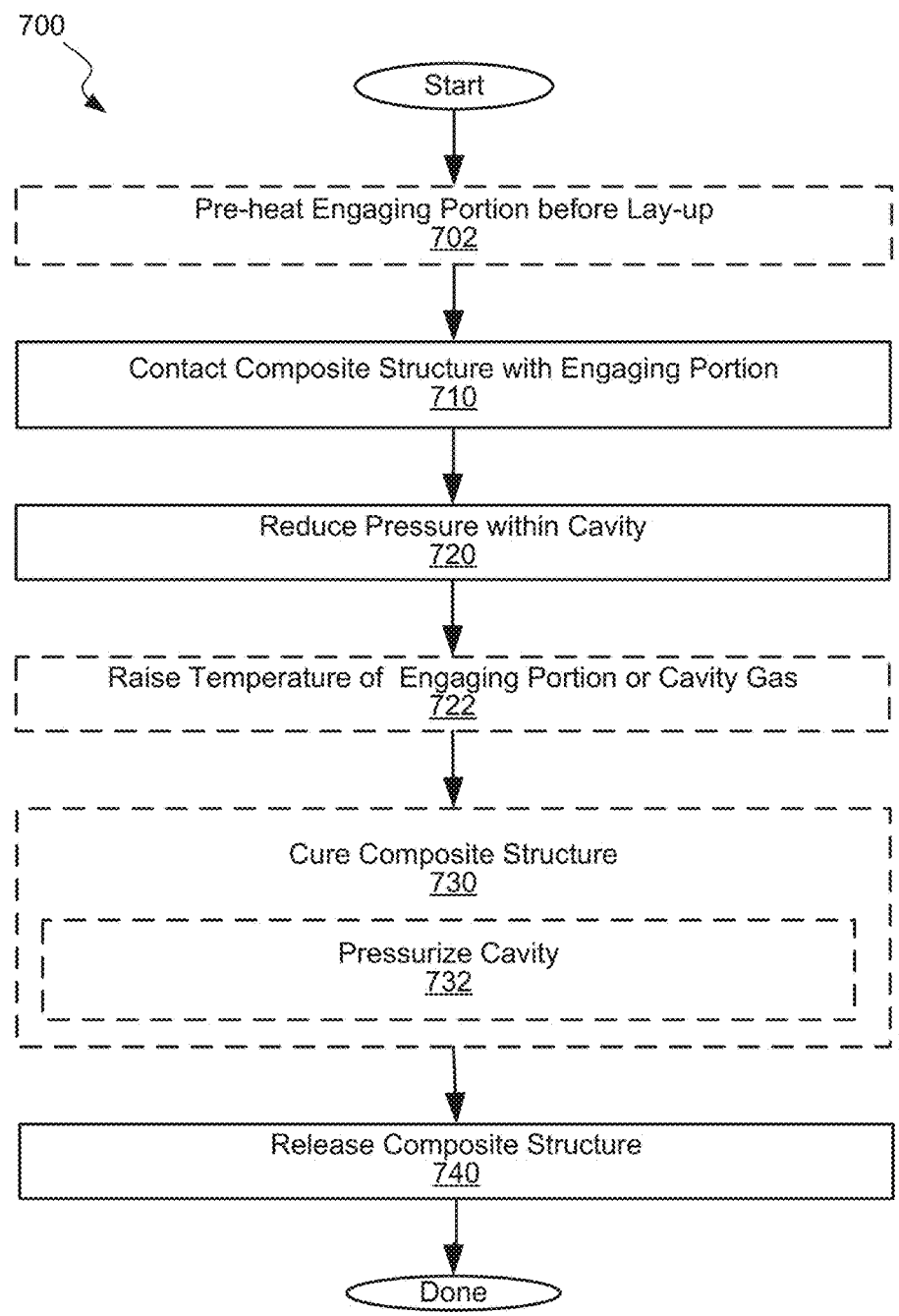

FIG. 7B is a process flowchart corresponding to a method of engaging a composite structure with an end effector, in accordance with some embodiments.

Provided also is method 700 of engaging composite structure 210. Method 700 uses end effector 100. Various examples of suitable end effectors are described above. Method 700 may comprise contacting composite structure 210 with engaging portion 120 during operation 710. Once engaging portion 120 is in contact with composite structure 210, method 700 may proceed removably adhering the composite structure 210 with the engaging portion 120. For example, method 700 may involve reducing pressure within cavity 112 of housing 110. This reduction of pressure within cavity 112 may force composite structure 210 against engaging portion 120.

In some embodiments, method 700 further comprises, prior to contacting composite structure 210 with engaging portion 120 during operation 710, heating engaging portion 120 during operation 702. This heating may reduce or otherwise change flexibility of engaging portion 120. Likewise, base 130 may be heated to increase its flexibility and/or other purposes. In some embodiments, heating engaging portion 120 comprises blowing a hot air through cavity 112 and the plurality of openings 122. In the same or other embodiments, heating engaging portion 120 comprises using a heater 132 of housing 110.

In some embodiments, method 700 further comprises, after contacting composite structure 210 with engaging portion 120 during operation 710, heating engaging portion 120 during operation 722. This post-engagement heating may be, for example, a part of curing of composite structure 210. In some embodiments, method 700 further comprises curing composite structure 210 during operation 730. Composite structure 210 may be in contact with engaging portion 120 during this operation. Cavity 112 may be pressurized (as shown by block 732) while curing composite structure 210 during operation 730.

Examples of Aircraft and Methods of Fabricating and Operating Aircraft

Figure 8:
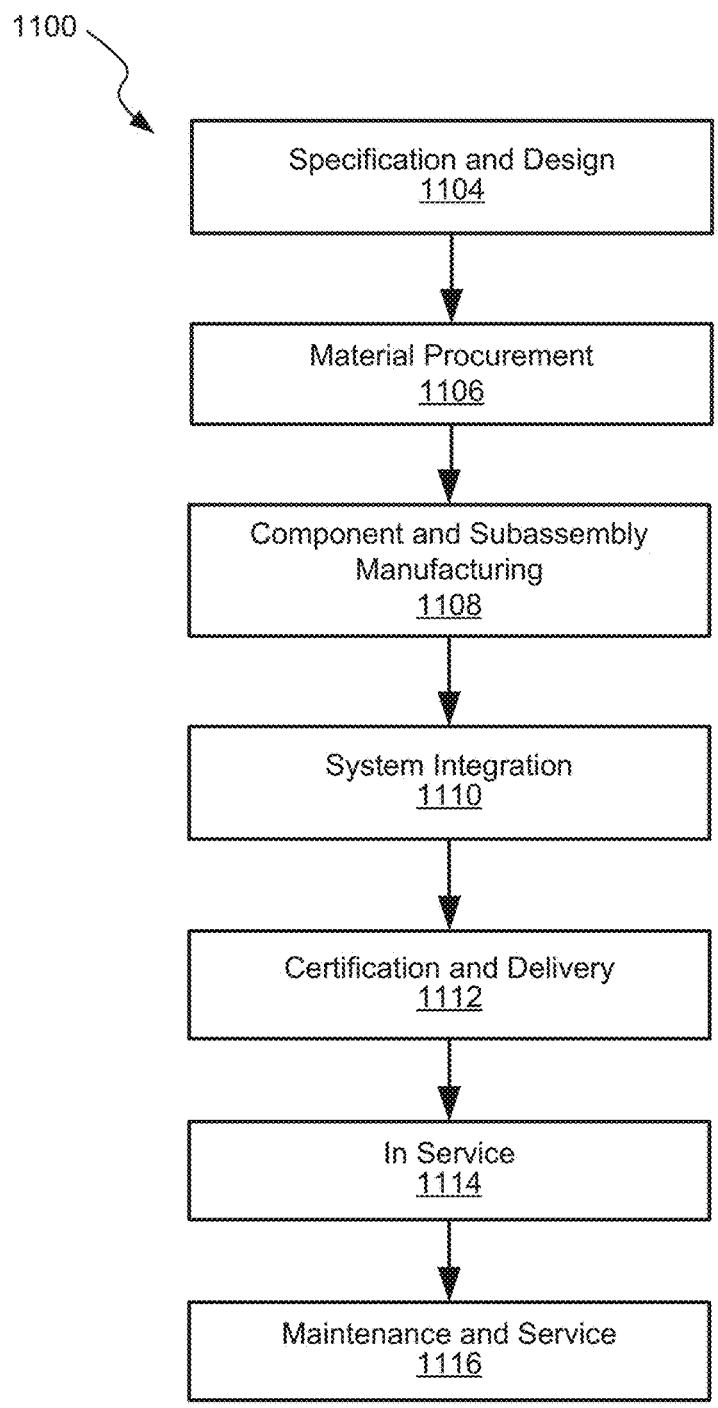
FIG. 8 is a block diagram of aircraft production and service methodology that may utilize end effectors described herein.
Figure 9:
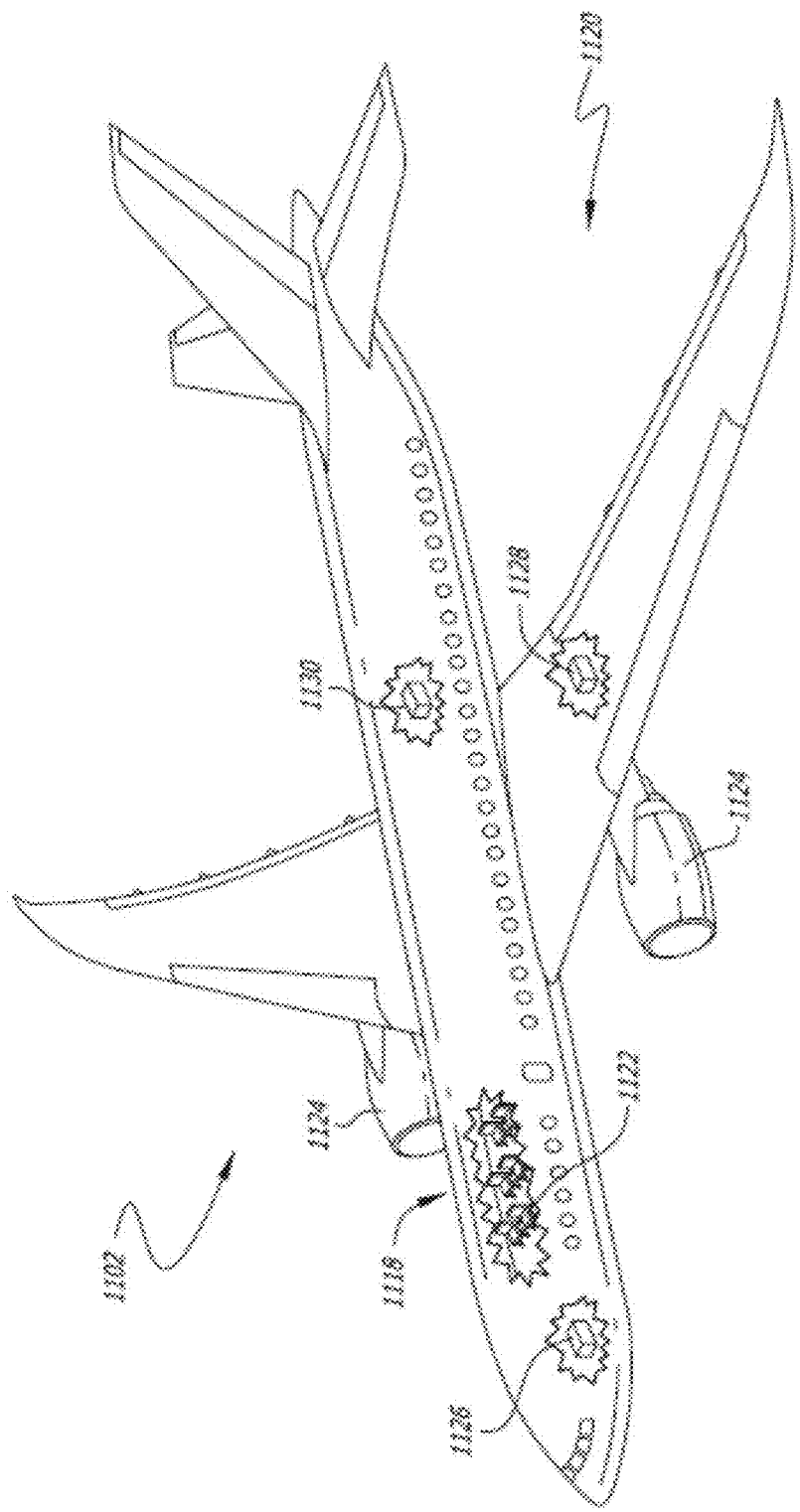
FIG. 9 is a schematic illustration of an aircraft that may include composite structures described herein.

Examples of the present disclosure may be described in the context of aircraft manufacturing and service method 1100 as shown in FIG. 8 and aircraft 1102 as shown in FIG. 9. During pre-production, illustrative method 1100 may include specification and design (block 1104) of aircraft 1102 and material procurement (block 1106). During production, component and subassembly manufacturing (block 1108) and system integration (block 1110) of aircraft 1102 may take place. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more systems of aircraft 1102. End effectors and methods of using these end effectors may be utilized during material procurement (block 1106) and/or component and subassembly manufacturing (block 1108).

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 9, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive and watercraft industries. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of manufacturing and service method 1100. For example, components or subassemblies corresponding to component and subassembly manufacturing (block 1108) may be fabricated or manufactured in a manner similar to components or subassemblies produced while aircraft 1102 is in service (block 1114). Also, one or more examples of the apparatus(es), method(s), or combination thereof may be utilized during production stages 1108 and 1110, for example, by expediting assembly of or reducing the cost of aircraft 1102 by improving efficiency of the existing process and performing three different tasks, historically done with three different tools, with only one tool. In addition, that one tool is highly reconfigurable for a making a wide variety of composite parts, reducing change-over time between types of parts and further reducing equipment storage/maintenance overhead. Similarly, one or more examples of the apparatus or method realizations, or a combination thereof, may be utilized, for example and without limitation, while aircraft 1102 is in service (block 1114) and/or during maintenance and service (block 1116). Composite parts showing signs of strain can be quickly replaced without maintaining a large inventory.

CONCLUSION

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the spirit and scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. An end effector for engaging a composite structure, the end effector comprising:
a housing comprising an engaging portion, a base, and a cavity surrounded by the engaging portion and the base,
the engaging portion comprising a plurality of openings in fluid communication with the cavity; and
a support structure supporting the engaging portion relative to the base,
the support structure being bendable,
the engaging portion contacting the base and having a non-planar outer surface conforming around the supporting structure.

2. The end effector of claim 1, wherein the support structure is disposed with the cavity.

3. The end effector of claim 1, wherein the support structure is bendable relative a principal axis of the end effector.

4. The end effector of claim 3, wherein the support structure is bendable in two planes orthogonal to the principal axis of the end effector.

5. The end effector of claim 1, wherein the support structure is a wireframe.

6. The end effector of claim 5, wherein the support structure comprises modules.

7. The end effector of claim 6, wherein the modules are interconnected at a base-adjacent side of the support structure.

8. The end effector of claim 7, wherein the modules are rigidly interconnected at the base-adjacent side of the support structure.

9. The end effector of claim 6, wherein the modules are interconnected at a cap-adjacent side of the support structure.

10. The end effector of claim 9, wherein the modules a connected at the cap-adjacent side of the support structure using slidable connectors.

11. The end effector of claim 6, wherein the modules comprise shaped frames extending orthogonal to the principal axis of the composite structure.

12. The end effector of claim 11, wherein a perimeter of the shaped frames is trapezoidal.

13. The end effector of claim 1, wherein the plurality of openings forms an array in which openings in the plurality of openings are evenly spaced within the engaging portion and wherein the engaging portion is formed from a gas-impermeable material.

14. The end effector of claim 1, wherein the engaging portion is formed from a gas-permeable material having the plurality of openings.

15. The end effector of claim 14, wherein the gas-permeable material of the engaging portion comprises a mesh.

16. The end effector of claim 1, further comprising one or more pressure ports for connecting at least one of a vacuum source or a gas source, the one or more pressure ports being in fluid communication with the cavity.

17. The end effector of claim 16, wherein the one or more pressure ports are positioned on the base.

18. The end effector of claim 1, further comprising a heater for controlling a temperature of at least one of the engaging portion, the base, or a gas exiting the cavity through openings.

19. The end effector of claim 18, wherein the heater is disposed within the base.

20. A method of engaging a composite structure using an end effector, the method comprising:
  contacting the composite structure with an engaging portion of a housing of the end effector,
    the housing further comprising a base and a cavity surrounded by the engaging portion and the base,
    the engaging portion comprising a plurality of openings in fluid communication with the cavity; and
    the end effector comprising a support structure, supporting the engaging portion relative to the base, the support structure being bendable,
    the engaging portion contacting the base and having a non-planar outer surface conforming around the supporting structure; and
  once the engaging portion is in contact with the composite structure, removably adhering the composite structure with the engaging portion.

* * * * *